Nov. 29, 1938.   R. FARIES   2,138,485
TRUCK
Filed Aug. 23, 1935   5 Sheets-Sheet 1
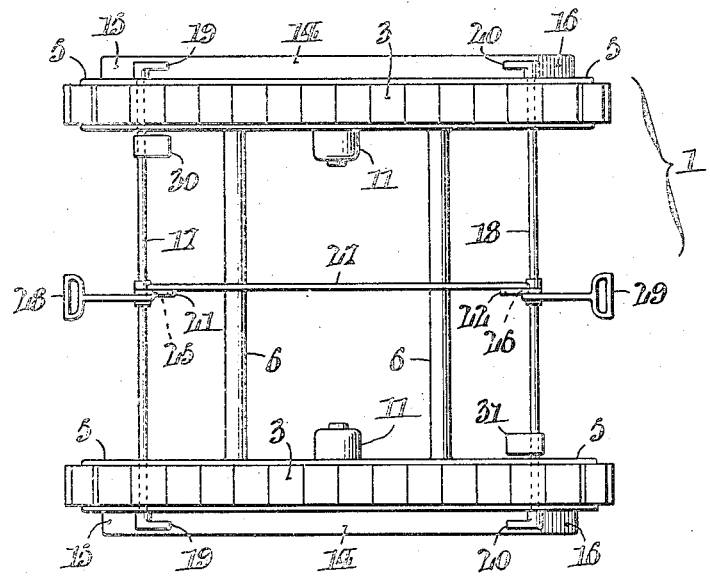
FIG. I.
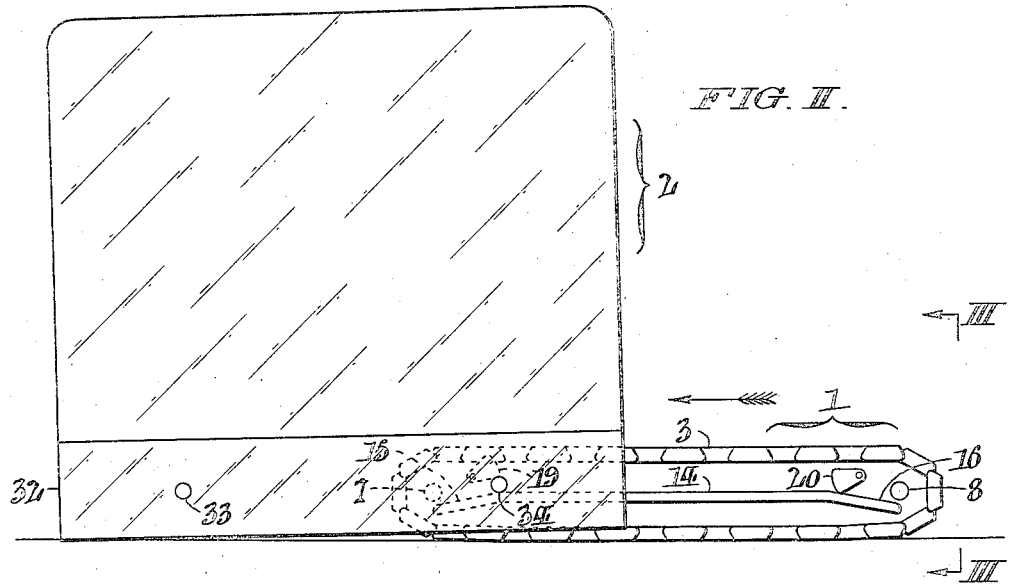
FIG. II.
WITNESSES:
John C. Bergner.
John A. Weidler
INVENTOR:
Robert Faries,
BY Fraley Paul
ATTORNEYS.

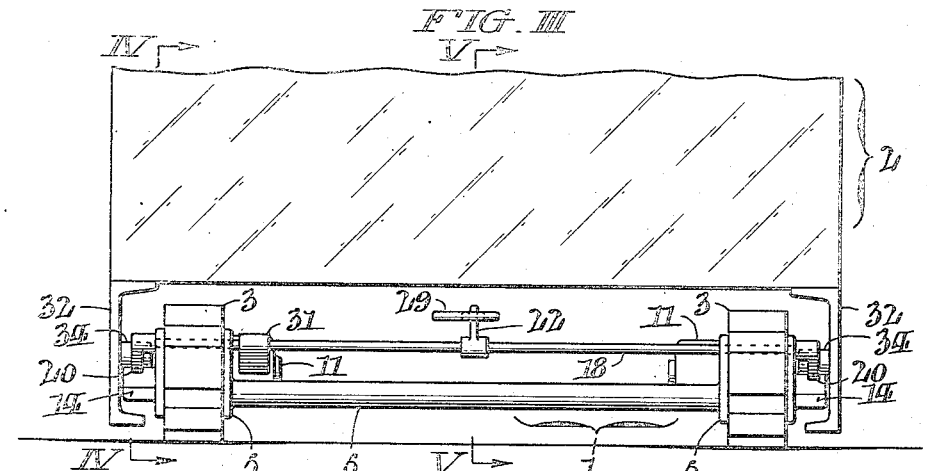
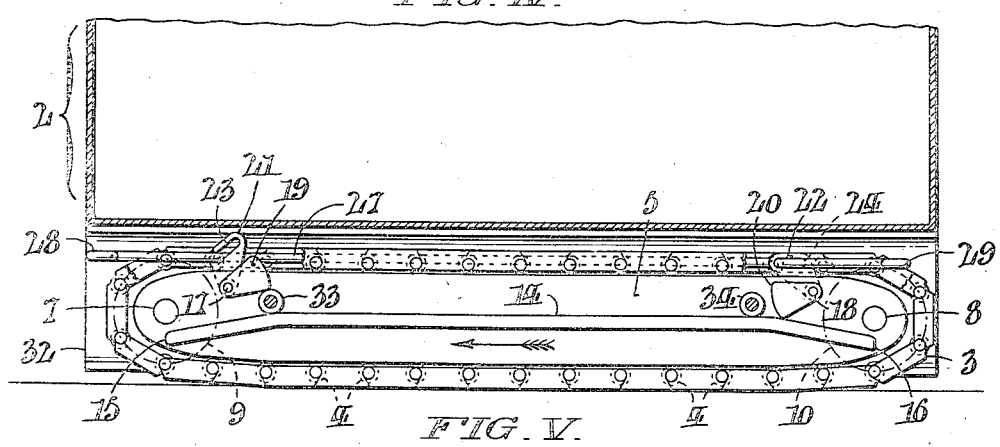
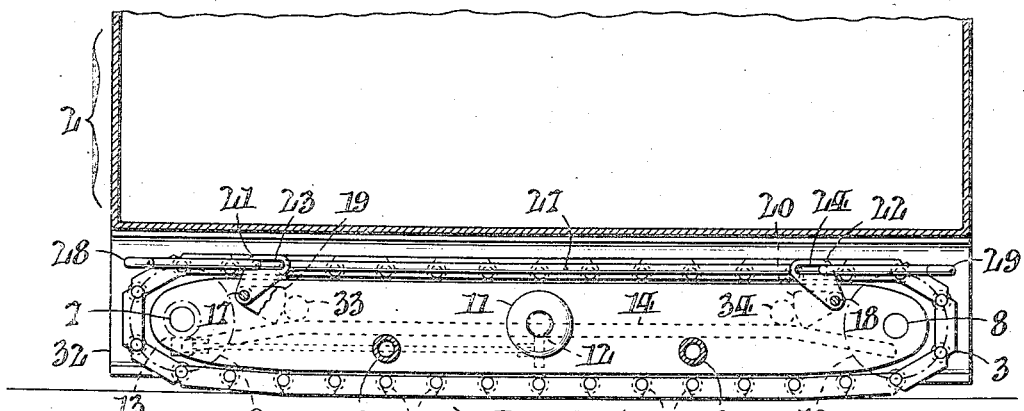

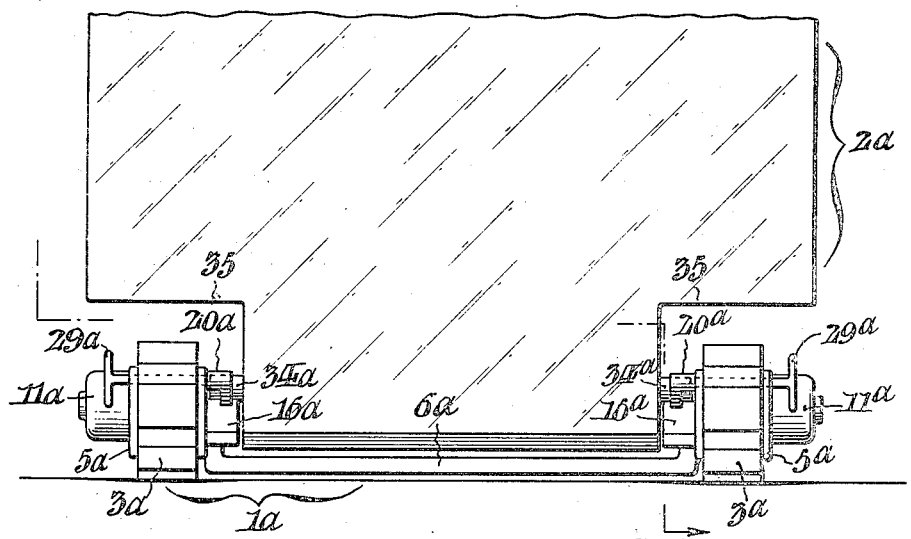
FIG. VI.
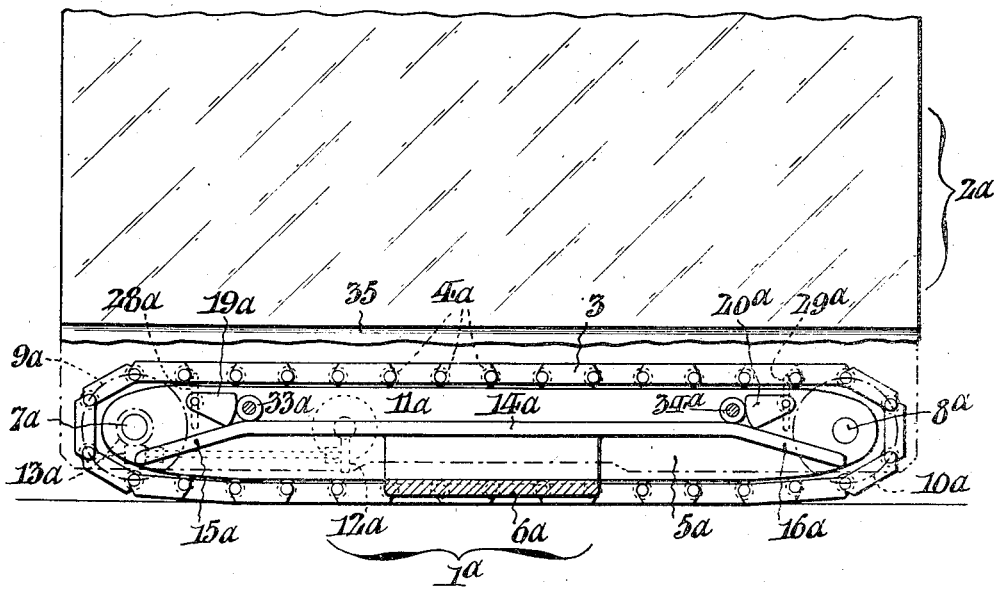
FIG. VII.

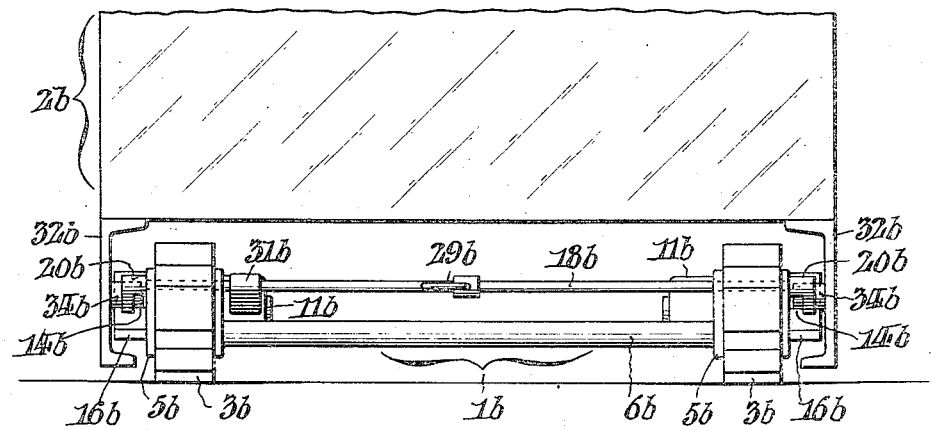
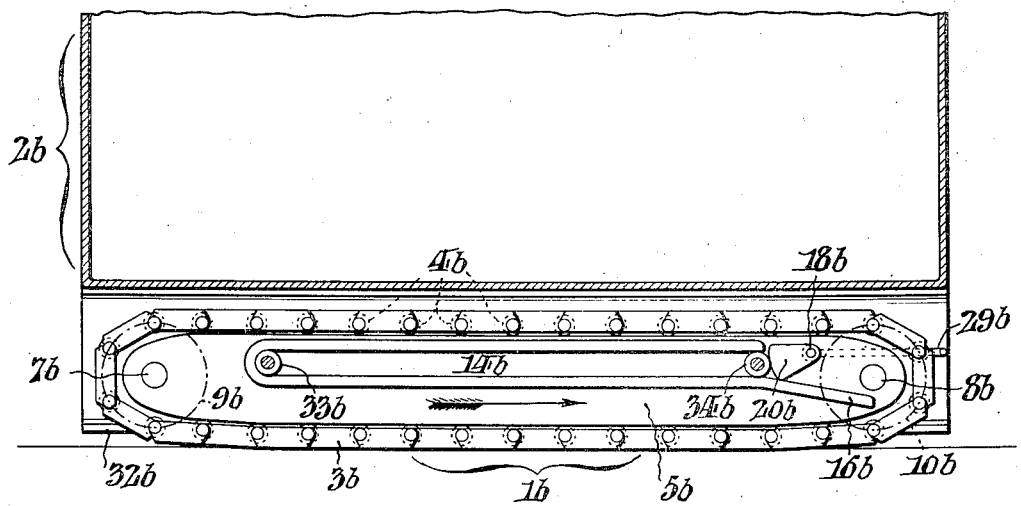

Nov. 29, 1938.  R. FARIES  2,138,485
TRUCK
Filed Aug. 23, 1935  5 Sheets-Sheet 5
FIG. X.
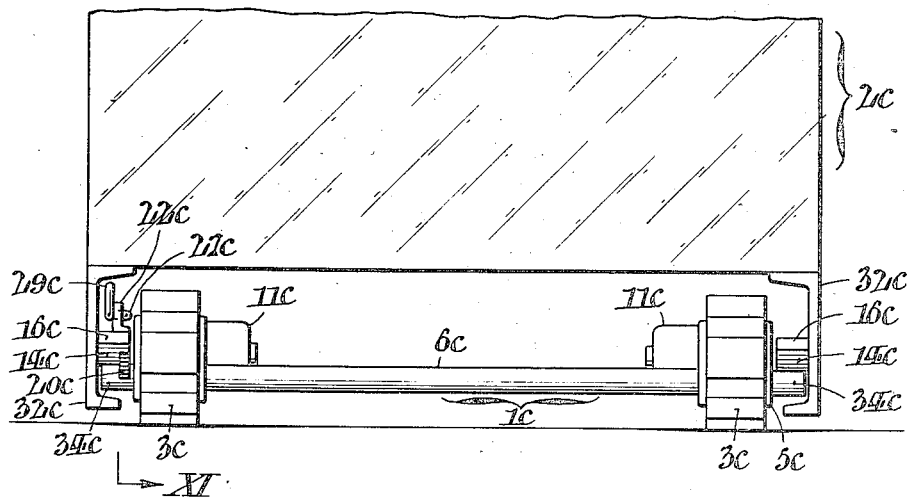
FIG. XI.
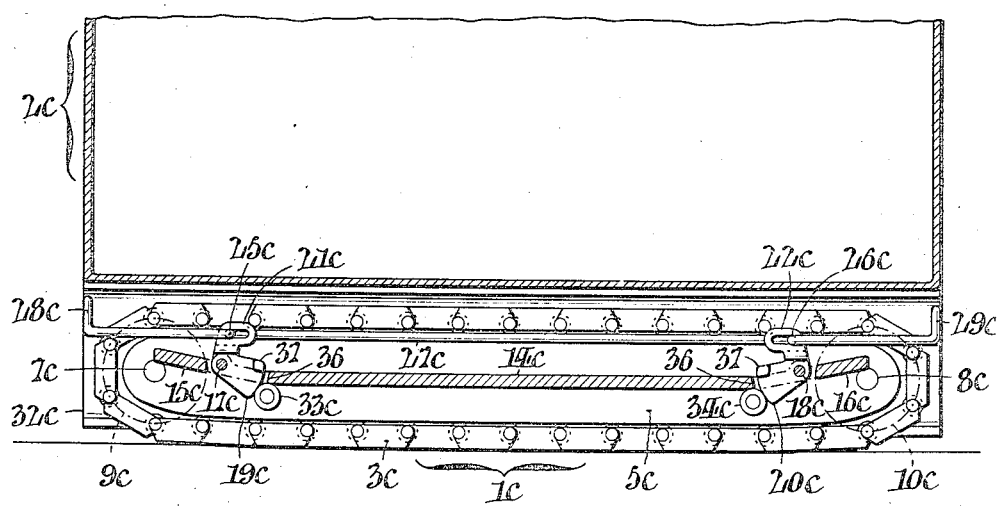
WITNESSES:
John C. Bergner
John A. Weidler
INVENTOR:
Robert Faries,
BY Fraley Paul
ATTORNEYS.

Patented Nov. 29, 1938

2,138,485

UNITED STATES PATENT OFFICE 2,138,485

TRUCK

Robert Faries, St. Davids, Pa.

Application August 23, 1935, Serial No. 37,477

10 Claims. (Cl. 254—45)

This invention relates to trucks useful more particularly in transferring railway shipping containers for less than carload lots of freight between auto trucks, railway cars or station platforms.

My invention is directed toward making it possible to move containers of the kind referred to from place to place without incurring any manual effort in the operation. This objective I realize in practice, as hereinafter more fully set forth, in a low, steerable, power-driven truck adapted to be run into supporting position beneath the container, and having means, which, incident to movement of the truck are operative to automatically lift the container clear of the ground in readiness to be transported.

In connection with a truck having the above attributes, it is a further aim of my invention to provide means also automatically operative incident to running of the truck beneath the container, to lock the latter against shifting during transport; as well as to provide means whereby the locking means may be released when the truck is to be withdrawn after transport of the container to the desired location.

Other objects and attendant advantages will be manifest from the detailed description which follows of the attached drawings, wherein Fig. I shows the top plan view of a truck for moving shipping containers, conveniently embodying my invention in one form.

Fig. II is a view in side elevation showing how the truck of Fig. I is run into supporting position beneath the container which is to be moved.

Fig. III is a fragmentary view in elevation drawn to a larger scale and looking as indicated by the arrows III—III in Fig. II.

Figs. IV and V are sectional views taken as indicated respectively by the arrows IV—IV and V—V in Fig. III.

Fig. VI is a view corresponding to Fig. III and showing an alternative embodiment of my invention.

Fig. VII is a view partly in elevation and partly in section, taken as indicated by the arrows VII—VII in Fig. VI.

Figs. VIII and IX are views corresponding to Figs. III and V showing another alternative form of my invention.

Figs. X and XI are views like Figs. III and V showing still another alternative embodiment.

With more detailed reference first to Figs. I-V of these illustrations, the numeral 1 comprehensively designates the truck; and the numeral 2, the shipping container which is to be moved. As shown, the truck 1 comprises a pair of relatively broad, laterally-spaced, endless tractor chain belts 3, 3 having rollers 4 on their links that contact with the upper and lower longitudinal edges of guide frames indicated at 5, 5. From Figs. I, III and V it will be observed that the frames 5 are rigidly connected by a pair of stout transverse grits 6, and that they afford bearings substantially centrally of their opposite ends for the shafts 7 and 8 carrying the sprocket wheels 9 and 10 about which the belts 3 are trained, the diameters of said wheels corresponding substantially to the height of said frames. The tractor belts 3 are arranged to be separately driven by electric motors 11, 11 which are respectively supported at the inner sides of the frames 5, and which are respectively coordinated by worm gearing, such as shown in dotted lines at 12 and 13 in Fig. V, with the shafts 7 to drive the sprockets 9 and thereby motivate the tractor belts 3. As shown, the motors 11 are within the vertical confines of the side frames 5 and therefore do not project above the top planes of the truck. At their outer sides, the frames 5 are formed with laterally-projecting horizontal ledges 14 having sloping approaches or ramps 15 and 16 at their opposite ends; and extending crosswise between said frames near their opposite ends, are rock shafts 17, 18 whereto are secured gravity-influenced stops 19 and 20. Medially of the rock shafts 17, 18 are arms 21 and 22 with slots 23 and 24 respectively engaged by offsets 25 and 26 (Fig. I) of a connecting control rod 27 which extends longitudinally of the tractor, and which is provided with grasp handles 28 and 29 conveniently accessible respectively at opposite ends of the truck. Weights 30 and 31 on the shafts 17 and 18 tend to urge the stops 19 and 20 downward into contact with the ledges 14.

Fastened to the bottom of the container 2 in flush relation to the container sides, are inwardly-facing sill bars 32 of channel section, which, adjacent their opposite ends, are provided with longitudinally-spaced, lateral, inward projections in the form of rollers 33 and 34 respectively.

The use of the truck 1 is as follows: With both motors 11 operating and the container suitably held against shifting, the truck 1 is run, for example, in the direction indicated by the arrows in Figs. II and IV, into the open interval or tunnel formed by the sill bars 30 at the bottom of the container 2, incident to which the inclines 15 of the ledges 14 engage beneath the rollers 34 on said sill bars. As the truck 1 continues in its advance, the rollers 34 ride up the inclines 15 to the horizontal or level portions of the ledges 14 with attendant tilting of the container as shown in Fig. II. Incidentally also, the rollers 34 push up the stops 19, which, after said rollers pass them, drop back to their normal positions. With further advance of the truck 1, the inclines 14 of the ledges 13 eventually engage beneath the rollers 34 as in Fig. IV and lift the container to an even keel clear of the ground, the stops 19 yielding at this time to being displaced as they pass said rollers. Movement of the truck in relation to the container 2 ceases upon engagement of the stops 20 with the rollers 34, and passage of the stops 19 beyond the rollers 33, whereupon the last mentioned stops drop behind said rollers 33 as shown in Fig. V. With the container 2 now locked against shifting in elevated position on the truck 1, the motors 11 may be concurrently run in either direction to correspondingly drive the tractor belts 3 and thus effect transport of the container straightaway, either forwards or backwards as desired. On the other hand, by employing the motors 11 individually, the truck may be steered for curvilinear progression of the container in one direction or the other. When the container is to be set down after having been transported to the desired location, the stops 19, for example, may be lifted to clear the rollers 31 by a pull on the handle 28 of the control rod 27, whereupon, by reversing the motors 11 and holding the container against movement, the truck will withdraw itself from beneath said container. In this connection it will be observed that the slots 23 and 24 in the arms 21 and 22 allow independent automatic action of the stops 19 and 20 when the truck 1 is run into position beneath the container, and that, moreover, they allow independent operation of said stops by means of the control rod.

In the alternative form of my invention illustrated in Figs. VI and VII, the container 2a is provided with inward recesses 35 along opposite sides of its bottom to accommodate the tractor belts 3a of the truck 1a when the latter is run into position beneath said container, without projection of any part of the truck beyond the confines of said container. In this embodiment, the ledges 14a are located at the inner sides of the frames 5a for capacity to coact with rollers 33a and 34a projecting outward from the sides of the recesses 35 of the container; and it will be further noted that the stops 19a and 20a are provided in this instance with individual control handles 28a and 29a. In all other respects the construction of the alternative form of my invention just described is like that of the first embodiment. Accordingly, in order to obviate duplicity in description, the same reference numerals, each with the letter "a" for the purposes of distinction, have been employed to designate corresponding parts not specifically referred to.

In Figs. VIII and IX I have shown still another alternative embodiment in which horizontal grooves 14b are provided on the frames 5b of the truck 1b to engage the lateral rollers 33b and 34b on the container 2b. From Fig. IX it will be observed that the grooves 14b are closed at one end, and open at the other where they are provided with inclined approaches 16b. The truck 1b is adapted to be run beneath the container 2b in the direction indicated by the arrow in Fig. IX, movement of the truck relative to the container ceasing upon engagement of rollers 33b with the closed ends of the grooves 14b and dropping of the stops 20b behind the rollers 34b. The shaft 18b extends all the way across the truck and is rockable to actuate the stops 20b by means of a centrally attached handle 29b. Again in order to avoid the necessity for repetitive description, the same reference numerals have been employed as in Figs. VI and VII to designate corresponding parts not specifically mentioned, the letter b having however been used with each number for the purposes of differentiation.

In the form of my invention illustrated in Figs. X and XI, the ledges 14c are secured to the inner sides of the sill bars 32c of the container 2c, and the rollers 33c, 34c to the outer sides of the frames 5c of the truck 1c. The ends 15c and 16c of the ledges 14c, it will moreover be noted slope upwardly instead of downwardly as in the previous forms so that the rollers 33c, 34c may pass beneath them as the truck 1c is run into supporting position, and, by cooperation with said rollers, lift the container clear of the ground. The stops 19c, 20c are in this instance pivoted on the tops of the ledges 14c and move up and down in notches 36 in the edges of said ledges. The downward movement of the stops 19c, 20c to operative position is limited by engagement of lugs 37 on them with the tops of the ledges 14c. The actuating means for the stops 19c, 20c is generally like that of Fig. I, that is to say, it includes a longitudinal rod 27c with offsets 25c, 26c engaging slotted arms 21c, 22c on the shafts 17c, 18c, and with grasp handles 28c, 29c at opposite ends thereof. While the stop mechanism is shown at one side only of the container 2c, in Figs. X and XI, if desired or found expedient, it can be duplicated at the other side and the two coordinated for simultaneous actuation after the manner described in connection with Figs. I–V.

The forms of my invention chosen for illustration herein are of course to be considered as representative of other alternative forms possible within the scope of the appended claims. Furthermore, while I have herein indicated electric motors for actuating the transfer trucks, obviously other types of prime movers may be employed instead, without departing from the spirit of my invention.

Having thus described my invention, I claim:

1. In combination, a shipping container with inward recesses along its bottom at opposite sides thereof; and a truck adapted to be run beneath the container, said truck being of a width corresponding to that of the container and comprising tractor belts laterally-spaced for accommodation within the recesses of the container, transversely connected frames with journals for wheels about which the belts are trained, said frames having inwardly extending horizontal ledges with sloping ends to cooperate with outward projections in the recesses of the container in automatically lifting the latter clear of the ground when the truck is run into position as aforesaid and to so support the container thereafter during transport; and means incidentally operative to automatically lock the container to the truck.

2. A truck adapted to be run into position beneath a shipping container and provided with horizontal grooves along opposite sides to respectively receive spaced lateral projections at the corresponding sides of the container and thereby support the latter clear of the ground, said grooves being respectively closed at one end, and open at the other end, the open ends having sloping approaches to cooperate with the aforesaid projections as the truck is advanced beneath the container in lifting the latter to the plane of the grooves, and means incidentally operative to automatically lock the container to the truck.

3. A truck adapted to be run into supporting position beneath the shipping container, said truck comprising horizontal ledges with sloping ends to cooperate with lateral projections on the container in automatically lifting the latter clear of the ground when the truck is run into position as aforesaid; gravity stops to coact with the projections on the container in locking the latter against shifting on the truck during transport, said stops yielding to displacement automatically as the truck is run beneath the container; and means whereby the stops may be selectively actuated to permit withdrawal of the truck after the container has been transported to the desired location.

4. In combination, a shipping container with inward recesses along its bottom at opposite sides thereof; a truck adapted to be run beneath the container, said truck being of a width corresponding to that of the container and comprising tractor belts laterally spaced for accommodation within the recesses of the container, transversely connected frames with journals for wheels about which the belts are trained, said frames having inwardly extending horizontal ledges with sloping ends to cooperate with outward projections in the recesses of the container in automatically lifting the latter clear of the ground when the truck is run into position as aforesaid and to so support the container thereafter during transport; means incidentally operative to automatically lock the container to the truck; and means whereby the locking means can be released subsequently when the truck is to be withdrawn from beneath the container.

5. In combination, a shipping container with inward recesses along its bottom at opposite sides thereof; a truck adapted to be run beneath the container, said truck being of a width corresponding to that of the container and comprising tractor belts laterally spaced for accommodation within the recesses of the container, and transversely connected frames with journals for wheels about which the belts are trained, said frames having inwardly extending horizontal ledges with sloping ends to cooperate with outward projections within the recesses of the container in automatically lifting the latter clear of the ground when the truck is run into position as aforesaid and to so support the container thereafter during transport; gravity stops on the truck to coact with projections on the container in locking the latter against shifting during transport, said stops yielding to displacement automatically as the truck is run beneath the container; and means whereby the stops can be independently operated to permit withdrawal of said truck from beneath the container when the latter has been transported to the desired location.

6. A truck adapted to be run into position beneath a shipping container and provided with horizontal grooves along opposite sides to respectively receive spaced lateral projections at the corresponding sides of the container and thereby support the latter clear of the ground, said grooves being respectively closed at one end and open at the other end, the open end having sloping approaches to cooperate with the aforesaid projections as the truck is advanced beneath the container in lifting the latter to the plane of the grooves; and releasable stops cooperating with the projections on the container at the open end of the grooves on the truck to lock said container against shifting during transport.

7. A truck for conveying shipping containers and the like, comprising a frame; mobile supports therefor; continuous horizontal ledges on the frame adapted by cooperation with lateral projections on the container to automatically lift the latter clear of the ground in readiness to be transported during movement of the truck, either end foremost, into position beneath said container; and releasable means on the truck frame also adapted to cooperate with the lateral projections on the container in automatically locking it against shifting on the frame during transport.

8. In a transfer truck of the character described, a pair of transversely-spaced interconnected horizontal side frames respectively having laterally-projecting longitudinal ledges with ramp ends; supporting wheels journaled substantially centrally of opposite ends of the frames, the diameters of said wheels being substantially equal to the height of said frames; and separate motors respectively supported by the latter for driving one of the wheels at each side of the truck, said motors being within the confines of said frames so that the truck as a whole can be run beneath a container or the like which is to be moved.

9. In a transfer truck of the character described, a pair of transversely-spaced interconnected horizontal side frames respectively having laterally-projecting longitudinal ledges with ramp ends; and a pair of endless tractor belts trained for movement around the edges of said frames in bearing contact with said edges.

10. In a transfer truck of the character described, a pair of transversely-spaced interconnected side frames respectively having laterally-projecting longitudinal ledges with ramp ends; a pair of endless tractor belts trained for movement around the edges of said frames; and individual motors for driving the belts respectively supported by the frame, said motors being within the vertical confines of the frames so that the truck as a whole can be run beneath a container or the like which is to be transported.

ROBERT FARIES.